(12) United States Patent
Schwenkel (10) Patent No.: US 9,519,283 B2
(45) Date of Patent: Dec. 13, 2016

(54) METHOD AND APPARATUS FOR TRANSMITTING DATA IN AN AUTOMATED CONTROL SYSTEM

(75) Inventor: Hans Schwenkel, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 865 days.

(21) Appl. No.: 13/114,158

(22) Filed: May 24, 2011

(65) Prior Publication Data

US 2011/0279231 A1 Nov. 17, 2011

Related U.S. Application Data

(63) Continuation of application No. PCT/EP2009/008261, filed on Nov. 20, 2009.

(30) Foreign Application Priority Data

Nov. 25, 2008 (DE) .................. 10 2008 060 007

(51) Int. Cl.
 *H02J 13/00* (2006.01)
 *G05B 19/418* (2006.01)
 *H04L 12/403* (2006.01)

(52) U.S. Cl.
 CPC ......... *G05B 19/4186* (2013.01); *H04L 12/403* (2013.01); *G05B 2219/21033* (2013.01);
 (Continued)

(58) Field of Classification Search
 CPC ........... G05B 2219/21033; G05B 2219/25002; G05B 2219/25213; H04L 12/403
 See application file for complete search history.

(56) References Cited

U.S. PATENT DOCUMENTS

| | | |
|---|---|---|
| 4,570,215 A | 2/1986 | Miura et al. |
| 5,872,934 A | 2/1999 | Whitehouse et al. |

(Continued)

FOREIGN PATENT DOCUMENTS

| | | |
|---|---|---|
| CN | 101111807 A | 1/2008 |
| DE | 195 45 566 A1 | 6/1997 |

(Continued)

OTHER PUBLICATIONS

DIN EN 954-1, Safety-related parts of control systems Part 1: General principles for design, Mar. 1997, 34 pages.

(Continued)

*Primary Examiner* — Benjamin C Lee
*Assistant Examiner* — Rajsheed Black-Childress
(74) *Attorney, Agent, or Firm* — Harness, Dickey & Pierce, P.L.C.

(57) ABSTRACT

A control system has a plurality of spatially distributed stations. At least some of the stations have input connectors for connecting sensors or output connectors for connecting actuators. The stations are connected from station to station to form a series of stations. The series has a first station, at least one second station and a last station. The first station and every second station have a successor in the series. Every second station and the last station have a predecessor in the series. In order to transmit data in this control system, the first station generates a number of separate data telegrams which is equal to the number of second stations plus the last station. Each data telegram is addressed to precisely one of the stations. The first station sends the data telegrams on by one at defined time intervals to its successor, wherein the data telegrams are addressed in reverse order of the stations. Every second station receives a data telegram from its respective predecessor and sends the received data telegram to its respective successor in the manner of a bucket brigade until it receives a data telegram which is addressed itself. The second stations and the last station each generate an individual reply telegram which is directed to the first station, and send the individual reply telegrams to their respective predecessors in the manner of a bucket brigade.

7 Claims, 2 Drawing Sheets

(52) U.S. Cl.
CPC ............. *G05B 2219/25002* (2013.01); *G05B 2219/25213* (2013.01); *Y02P 90/185* (2015.11)

(56) References Cited

U.S. PATENT DOCUMENTS

| | | | |
|---|---|---|---|
| 5,914,957 A | | 6/1999 | Dean et al. |
| 6,587,943 B1 * | | 7/2003 | Hardjono .................... 713/163 |
| 6,736,327 B1 | | 5/2004 | Hersel et al. |
| 6,853,292 B1 | | 2/2005 | Kramer et al. |
| 6,963,944 B1 | | 11/2005 | Rettig et al. |
| 7,715,932 B2 | | 5/2010 | Seizinger |
| 2002/0024436 A1 * | | 2/2002 | Suzuki et al. ............... 340/506 |
| 2002/0126620 A1 | | 9/2002 | Heckel et al. |
| 2006/0190101 A1 * | | 8/2006 | Seizinger ........... G05B 19/4184 700/79 |
| 2008/0002737 A1 * | | 1/2008 | Schwenkel et al. .......... 370/463 |
| 2008/0059671 A1 | | 3/2008 | Blumcke et al. |

FOREIGN PATENT DOCUMENTS

| | | |
|---|---|---|
| DE | 197 56 564 A1 | 6/1998 |
| DE | 199 06 867 C1 | 7/2000 |
| DE | 199 28 517 A1 | 1/2001 |
| DE | 103 20 522 A1 | 11/2004 |
| DE | 10 2004 063 213 A1 | 7/2006 |
| DE | 10 2006 040 709 A1 | 3/2008 |
| DE | 10 2007 028 387 A1 | 8/2008 |
| DE | 10 2007 029 272 A1 | 8/2008 |
| EP | 0 972 388 | 10/1998 |
| JP | 5-153118 | 6/1993 |
| JP | 10-93565 | 4/1998 |
| JP | 2001-147706 | 5/2001 |

OTHER PUBLICATIONS

EN ISO 13849-1, Safety of machinery—Safety-related parts of control systems—Part 1: General principles for design, Nov. 2006, 97 pages.

CEI IEC 61508-2, Functional safety of electrical/electronic/programmable electronic safety-related systems—Part 2: Requirements for electrical/electronic/programmable electronic safety-related systems, May 2000, 152 pages.

* cited by examiner

Fig.1

METHOD AND APPARATUS FOR TRANSMITTING DATA IN AN AUTOMATED CONTROL SYSTEM

CROSS REFERENCES TO RELATED APPLICATIONS

This application is a continuation of international patent application PCT/EP2009/008261 filed on Nov. 20, 2009 designating the U.S., which international patent application has been published in German language and claims priority from German patent application DE 10 2008 060 007.5 filed on Nov. 25, 2008. The entire contents of these priority applications are incorporated herein by reference.

BACKGROUND OF THE INVENTION

The present invention relates to a method for transmitting data in an automated control system having a plurality of spatially distributed stations which communicate via a communication medium, and to a corresponding control system and station. In particular, the invention relates to a method which allows a control unit to communicate with remote I/O station of an automated control system in a simple and inexpensive manner.

The use of what is called field buses for data communication among a plurality of stations of a control system which are remote from one another is sufficiently known in control and automation technology. One example of a control system comprising a field bus is described in DE 199 28 517 A1. In said document, the field bus operates according to the Interbus protocol. A so-called bus master, which is arranged in the control unit, generates a data frame having a defined starting word (referred to as a loop back word) and a number of data fields which exactly corresponds to the number of stations which are connected to the field bus in addition to the control unit. The bus master and the further stations are connected in an annular structure in which the stations form a type of shift register. The data frame generated by the bus master is shifted step by step through the stations until the bus master receives back the starting word from the last station of the annular structure. By means of a control signal, the bus master then signals to all the stations that they are to read the data fields located in the station at this moment and they can assign their own new transmission data thereto. Subsequently, the bus master begins a new data cycle in which the data frame including the starting word is shifted around again in the annular shift register. Therefore, the transmission data of the stations arrive at the bus master in a serial manner. A characteristic of the Interbus protocol is therefore a single cyclically recirculating data frame, a part of which is respectively stored in each station at any time, wherein, in response to a control signal of the bus master, the individual stations read information out of assigned data fields and subsequently write their own information into these data fields. The functional principle can be presented as a circulating train which is pulled by a locomotive (in the form of the starting word), wherein the individual stations extract information from an individually assigned wagon and "load" the same wagon with information. An advantage of this principle is the determined timing behavior. On the basis of the length of the data frame and/or the number of stations it is possible to reliably predict how long it will take until the bus master has interrogated all the stations in one cycle. It is a disadvantage of the Interbus that every station has to read out and write to a location within the data frame which is assigned to said station, and this can only be implemented at an acceptable speed using special protocol chips. All the stations therefore require the special Interbus protocol chips. For applications in which only relatively small quantities of data are to be transmitted from and to a station, the Interbus concept is frequently too complex and too expensive.

Another field bus system in which communication between distributed stations is implemented via a cyclically circulating data frame is known from DE 10 2004 063 213 B4. According to exemplary embodiments proposed in this document, the circulating data frame is sent from one station to the next using Ethernet telegrams. In this case, the individual stations also have to read out and write to individually assigned data fields within the data frame, which also requires special protocol chips in order to reach acceptable speeds. In addition, the Ethernet telegrams require a relatively large protocol overhead and telegram overhead, and therefore the strengths of this known system are felt more in applications which require very powerful communication systems with relatively large information units.

DE 10 2006 040 709 A1 discloses a further method in which a plurality of stations are connected to form an annular structure. In this case again, a starting word followed by user data is passed on from one station to the next, wherein the individual stations append their own user data to the starting word. This known method is intended to operate without address data and, in particular, to transmit user data of short length.

Moreover, there is a plurality of field bus systems in which the stations can communicate with one another via data telegrams of their own. The stations are typically each connected to a common line via so-called T branches. If a station sends a data telegram, all the other stations can listen to it. Collisions or transmission conflicts which occur when two transmitting stations send simultaneously must be solved by the allocation of priorities or other arbitration methods. Examples of such field buses are known to the skilled persons as a CAN-bus, Profibus, SafetyBus p, DeviceNet or ASI. These bus systems use a common bus line with the disadvantage that a short circuit or line break can only be determined by means of physical measuring methods, not from the data communication on the bus. In addition, such a bus system is without function over the entire line length if a short circuit or line break occurs at a location. In the case of long lines and high data transmission rates, a terminating impedance is necessary, and each station must receive an individual address which has to be reassigned when a station is replaced. If the bus system also transmits safety-related data, such as for example information about the activation of an emergency-off button or a switch-off instruction for an actuator resulting therefrom, the address assignment is safety-related and therefore complex.

DE 103 20 522 A1 discloses a method and a device for controlling a safety-critical process, wherein remote I/O units send safety-related process data via a single-channel line to a control unit using a diverse multiple transmission, by virtue of the fact that the remote units transmit the useful data to be transmitted once "in plain text" and a second time in encoded form. The encoded data are generated here with a variable code.

SUMMARY OF THE INVENTION

Against this background, it is an object of the present invention to provide a method for allowing data communication of a distributed control system in an inexpensive and convenient manner.

It is also an object to provide a method for allowing simple and cost-effective data communication between a control unit and remote I/O units connecting various sensors and actuators to a central control unit.

It is yet another object to provide a method for data communication between a control unit and remote I/O units across a field bus having an efficient bus utilization with inexpensive hardware and low configuration complexity.

Furthermore, it is an object to provide a method and the control system which allow safety-related information to be transmitted over a field bus.

According to an aspect of the invention, there is provided a method for transmitting data in an automated control system having a plurality of spatially distributed stations which are connected from station to station to form a series of stations, wherein the series has a first station, at least one second station and a last station, wherein the first station and every second station each have a successor in the series, and wherein every second station and the last station each have a predecessor in the series, the method comprising the following steps: the first station generates a number of separate data telegrams, which number is equal to the number of second stations plus the last station, wherein each data telegram is addressed to one of the second and the last stations; the first station sends the data telegrams one by one at defined time intervals to its successor, wherein the data telegrams are addressed in reverse order of the stations; every second station receives a data telegram from its respective predecessor and sends the received data telegram to its respective successor in a manner of a bucket brigade, until it receives a data telegram which is addressed itself; and the second stations and the last station each generate an individual reply telegram which is directed to the first station, and they send the individual reply telegrams to their respective predecessor in a manner of a bucket brigade.

According to another aspect, there is provided a control system having a plurality of spatially distributed stations, at least some of which have input connectors for connecting sensors or output connectors for connecting actuators, wherein the stations are connected from station to station to form a series of stations, wherein the series of stations has a first station, at least one second station and a last station, wherein the first station and every second station each have a successor in the series, and wherein every second station and the last station each have a predecessor in the series, and wherein the first station is designed to generate a number of separate data telegrams, which number is equal to the number of second stations plus the last station, with every data telegram being addressed to one of the second and the last stations; the first station is further designed to send the data telegrams one by one at defined time intervals to its successor, wherein the data telegrams are addressed in reverse order of the stations; every second station is designed to receive a data telegram from its respective predecessor and to send the received data telegram to its respective successor in the manner of a bucket brigade until it receives a data telegram which is addressed to itself; and the second stations and the last station each are designed to generate an individual reply telegram directed to the first station, and to send the individual reply telegrams to their respective predecessors in the manner of a bucket brigade.

According to yet another aspect, there is provided a peripheral station for use in a control system having a plurality of spatially distributed stations, said stations being connected to one another from station to station in order to form a series of stations, wherein the series of stations defines a first station, at least one second station and a last station, wherein the first station and every second station each have a successor in the series, and wherein every second station and the last station each have a predecessor in the series, said peripheral station comprising a number of input connectors for connecting sensors and a number of output connectors for connection actuators; a first bus connector configured to be connected to a predecessor in the series of stations and a separate second bus connector configured to be connected to a successor in the series of stations; an address memory for storing a station address; and a communication module designed to receive a data telegram from the predecessor via the first bus connector, designed to detect whether the data telegram contains the station address, designed to forward said data telegram to said successor via said second bus connector if said station address is not contained in said data telegram, designed to generate a reply telegram in response to said data telegram if said station address is contained in said data telegram, designed to receive further reply telegrams from said successor via said second bus connector, and designed to forward the reply telegram and the further reply telegrams to said predecessor via said first bus connector.

The approach presented here differs from previously known methods and systems in various aspects, depending on which known method or system is used for the comparison. On the one hand, the stations of the new method and the new system are connected from station to station to form a series of stations. The new method and the new system therefore use a line topology instead of an annular structure. The data telegrams are sent one by one and in a serial manner from the first station to the adjacent second station and from there (and equally from all the further stations) to the respective adjacent station. Consequently, only a single data telegram does exist on each line part of the system. Due to the point-to-point connection between the individual stations in the series, collisions between data telegrams for various stations are avoided. The expenditure for arbitration is low. Preferably, the second stations and the last station each send their respective individual reply telegrams only in response to a data telegram addressed to them, so that a collision between data telegrams and reply telegrams is also avoided on the line parts of the system. In this case, arbitration can be dispensed with virtually completely.

On the other hand, the new method and the new system use individual data telegrams which are individually addressed to the stations, and corresponding individual reply telegrams. Each station receives and sends a telegram "of its own". No station has to be able to completely read and/or understand the telegrams of the other stations, and there is either no need for a uniform data frame for all the stations. As a result, it is possible, on the one hand, to dispense with expensive protocol chips, such as are required in the case of an Interbus and similar methods, in order to permit rapid reading and writing to individually assigned data fields of a data frame which is uniform on a system-wide basis. In principle, it is possible that every station receives data telegrams and sends reply telegrams which are incompatible with the respective telegrams for the other stations, provided that it is ensured that the telegrams can be passed through all the stations. For example, it is possible that the address data for a second station is at a different location on the data telegram than the address data for the last station. The type and the structure of the address data can also differ from station to station. All that is required is that the addressed station can detect and read its address within a received data telegram. The length of the individual data telegrams and of reply telegrams and the internal protocol structure can also vary from station to station, provided that the physical level is uniform in accordance with the OSI reference model to the extent that the data telegrams and reply telegrams can be passed onto another station.

If the line between two stations is interrupted, or malfunctioning in some other way, communication between stations which lie upstream and/or downstream of the interruption can generally continue. Consequently, a line fault does not necessarily disable the entire system and can be localized by virtue of the telegram traffic.

With the new method, it is also possible to achieve a high bus utilization rate on the first line part between the first station and its successor. Here, bus utilization can be adapted in an optimum manner to the operating speed of the first station. The further the other stations are away from the first station, the greater is the drop in the bus utilization rate of the corresponding line parts. However, this does not have any overall adverse effect on the efficiency of the control system as long as the first station can communicate with its successor at an optimum clock rate over the first part.

Finally, the new method and the new system permit, by virtue of the uniformly defined communication according to the "first in/last out" principle (from the point of view of the first station), very efficient automatic assignment of addresses to the individual stations, as will be described further below on the basis of a preferred exemplary embodiment. As a result, a large part of the configuration complexity which is necessary in other address-based systems is dispensed with. This is particularly advantageous if the data telegrams and reply telegrams contain at least to a certain extent safety-related data because the assignment of addresses to stations which generate or process such safety-related data is a safety-related step. Due to the clearly defined communication structure, safety-related stations can also be assigned an address in a failsafe fashion in terms of Categories 3 or 4 of the European Standard EN 954-1 (or similar requirements according to ISO 13849 or IEC/EN 61 508).

In summary, the new method and the new control system can thus be implemented with relatively simple and cost-effective hardware components, a low degree of complexity in terms of management and configuration, and a high bus utilization rate.

In a preferred refinement, the stations send all the data telegrams largely simultaneously to their respective successor.

This refinement makes an advantageous contribution to optimizing the overall bus utilization rate. However, it is not necessary for the stations to send the data telegrams precisely at the same time since they continue to be separate data telegrams.

In a further refinement, the second stations and the last station process the received data telegrams largely simultaneously with one another in order to generate the individual reply telegrams largely simultaneously.

This refinement also makes an advantageous contribution to optimizing the bus utilization rate and to speeding up the data communication between the individual stations. Furthermore, this refinement is particularly suitable for an automated control system in which a large number of steps often have to be carried out synchronously or at least with coordinated timing with respect to one another.

In a further refinement, the first station generates a plurality of address allocation telegrams and sends them to its successor before the data telegrams are sent for the first time, wherein the second stations and the last station each are assigned a unique station address on the basis of the address allocation telegrams.

The address allocation telegrams are advantageously generated and sent in an initialization mode which can be started by an operator and/or is started automatically whenever re-activation occurs or voltage is restored. Alternatively or additionally, it is possible in other refinement that the individual stations have an interface and/or one or more switches which can be used to individually assign an address to the respective station. The preferred refinement does not require such interfaces and switches even though it is possible to permit the preferred automatic address assignment in addition to manual address assignment. The preferred refinement with automatic address assignment permits simpler and faster configuration of the system. Furthermore, faults resulting from manual inputs are avoided. Moreover, the individual stations can be more easily and cost-effectively integrated into housings of the protective type IP 67, which facilitates use in areas at risk of spray water or splash water. The use of address allocation telegrams from the first station also provides the advantage that the first station is given control over all the other stations, and address collisions can easily be avoided.

In a further refinement, all the second stations which have received a unique station address send the address allocation telegrams to their respective successor.

In this refinement, automatic address assignment occurs from front to rear within the series of stations, i.e. from the successor of the first station to the last station. In particularly preferred variants of this refinement, each station sends an address confirmation telegram to the first station once it has received an address assigned to it. This permits failsafe address assignment to be implemented very quickly and easily.

In a further refinement, every second station has a first and a separate second bus connector, wherein every second station is connected via the first bus connector to its predecessor and via the second bus connector to its successor.

In this refinement, at least every second station (preferably also the last station) has two independent interfaces. The two bus connectors are preferably DC isolated from one another. The second stations can therefore receive and send data telegrams and reply telegrams simultaneously and independently of one another. This permits very rapid and flexible data communication and is particularly advantageous if the data telegrams and reply telegrams of the individual stations can differ in length. In one particularly preferred variant of this refinement, every bus connector comprises a separate controller module which generates the transmission signal. Every station therefore functions as a repeater, with the result that relatively large line lengths can be spanned between the stations.

In a further refinement, the bus connectors are CAN-bus compatible.

In this refinement, CAN bus hardware can be combined with a communication structure in the manner of a bucket brigade. This refinement is advantageous because CAN-bus compatible modules are very widespread and are accordingly available at low cost. Furthermore, CAN bus modules have integrated and proven fault recovery and correction mechanisms at a low level of the OSI model which can be very easily used for the present invention. However, a characteristic of this refinement is that the arbitration procedures of the CAN bus are not used as a result of the new communication structure.

In a further refinement, the first station sends data telegrams at cyclically recurring time intervals, wherein each data telegram comprises a code word which varies from time interval to time interval, and wherein the second stations and the last station generate the respective individual reply telegrams as a function of the code word which varies over time.

This refinement is very advantageous if safety-related data are exchanged between the first station and the further stations. Safety-related data in this sense are, for example, information about the state of an emergency-off button (activated, non-activated, undefined) or a switch-off instruction to an actuator resulting therefrom. This refinement makes it possible to transmit even such safety-related data on a single data line. By using the varying code word it is possible to check the plausibility of the transmitted safety-related data even if the data do not change over many time intervals, which is, by way of example, often the case with an emergency-off button.

In a further refinement, the first station generates and sends an individual data telegram for every second station and for the last station, wherein the individual data telegrams for at least two different stations are structurally different.

Structurally different data telegrams are, in particular, those whose structure and composition are different. For example, the address data in the one data telegram could be located relatively far to the front while the address data in a data telegram to another station could be located relatively far to the rear or at any other location. The structure and/or length of the address data, the number and use of protocol data, such as for example a checksum (CRC), or diverse multiple transmissions of data using varying code words can form the basis of structural differences. This refinement uses the advantageous possibilities of the new communication structure which result from the fact that the stations do not have to share common data frames but communicate via separate telegrams instead.

Of course, the features specified above and the features to be explained below can be used not only in the respectively specified combination but also in other combinations or alone, without departing from the scope of the present invention.

BRIEF DESCRIPTION OF THE DRAWINGS

Exemplary embodiments of the invention are illustrated in the drawing and will be explained in more detail in the following description in which.

DESCRIPTION OF PREFERRED EMBODIMENTS

Figure 1:
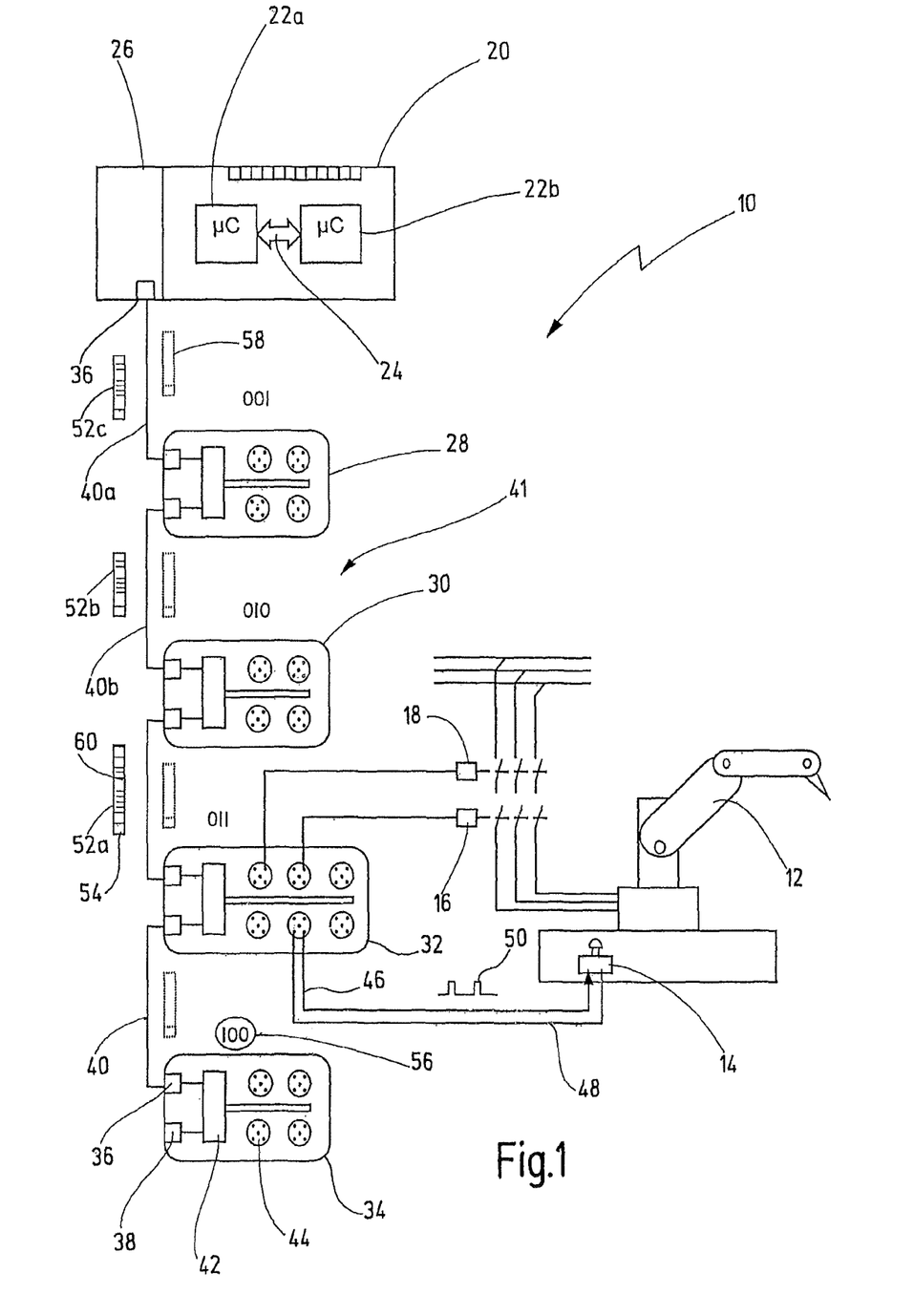
FIG. 1 shows a simplified illustration of a preferred exemplary embodiment of the new control system.

In FIG. 1, an exemplary embodiment of the new control system is denoted by the reference number 10 in its entirety. The control system 10 serves here to safeguard a robot 12 whose movements can pose a risk for persons owing to the speed and mass of the robot 12. Such robots are typically safeguarded using fixed protective fences and movable protective doors, light curtains and similar access protections as well as using emergency-off buttons. For the sake of simplicity, FIG. 1 merely illustrates one emergency-off button 14. A contact breaker is respectively illustrated by the reference numbers 16 and 18. The working contacts of the contact breakers 16, 18 are arranged in series with one another in the power supply path for the drives of the robot 12. When the emergency-off button 14 is activated, when a protective door opens or when a light curtain is traversed, the robot 12 must be shut down in a failsafe manner using the contact breakers 16, 18. "Failsafe" means in this context that the safety function is not lost even if a fault occurs within the control system 10. It may, for example, be the case that the working contacts of the contact breaker 16 are fused owing to a previous switching process and can no longer be opened. However, this fault does not lead to a loss of safety since the power supply can still be interrupted by the working contacts of the contact breaker 18. Similarly, the required single fault safety for other components of the control system 10 can be achieved by redundancy and/or integrated test functions.

FIG. 1 shows, for the sake of simplicity, only the control system 10 for safeguarding the robot 12 but not a control system for controlling the working operation of the robot 12. In principle, both control systems can be implemented in one control unit, However, in many cases a separate control unit, represented here by reference number 20, has been used for the safety functions to date. The control unit 20 in the preferred embodiments is established in a failsafe fashion, which is illustrated here in a simplified form on the basis of two redundant processors 22a, 22b which carry out all the operations redundantly and compare them with one another. The latter is symbolized by arrow 24.

What is referred to as a bus module is denoted by reference number 26 and can be integrated in the control unit 20, or is connected as a separate assembly to the control unit 20. In the illustrated exemplary embodiment, the bus module 26 is an assembly in a separate housing which can be attached to the housing of the control unit 20. In this exemplary embodiment, the bus module 26 is a first station in terms of the invention.

Reference numbers 28, 30, 32 and 34 denote further stations, wherein the station 34 is here a last station in terms of the invention. Stations 28 to 34 each have two bus connectors 36, 38 which are DC isolated and can be used independently of one another. The bus module 26 and the stations 28 to 34 are connected from station to station to form a series 41 of stations by means of line parts 40. For example, a first line part 40a connects the bus connector (here single connection) 36 of the bus module 26 to the first bus connector 36 of the station 28. A second line part 40b connects the second bus connector 38 of the station 28 to the first bus connector 36 of the following station 30. All the stations including the bus module 26 are therefore connected to at least one neighbor and at maximum two neighbors via point-to-point connectors. Station 28 is the successor of bus module 26 and the predecessor of station 30. No station is connected to more than two other stations here.

In this case, stations 28 to 34 are remote I/O units for connecting sensors including manually activated signaling devices such as, for example, the emergency-off button 14, and for connecting actuators such as, for example, the contact breakers 16, 18. In preferred exemplary embodiments, stations 28 to 34 are accommodated in a housing of the protection type IP 67 and therefore have spray water and even splash water protection. In other exemplary embodiments, stations 28 to 34 can be plug-type modules which are plugged onto a module carrier, or they can be accommodated in other housing designs.

Each station 28 to 34 has here an interface module 42 which is connected to both bus connectors 36, 38. In preferred exemplary embodiments, the interface module 42 is a microcontroller or an ASIC which is capable of executing defined signal processing steps or data processing steps which serve to condition sensor data for sending to the control unit 20 and to process actuator data from the control unit 20 in order to actuate, as a function thereof, actuators such as, for example, the contact breakers 16, 18.

Each station 28 to 34 has a number of connection sockets 44 to which sensors and/or actuators can be connected. In the exemplary embodiment according to FIG. 1, the emergency-off button 14 is connected via a forward line 46 and a return line 48 to a connection socket 44. A clock signal 50, which is fed back via the return line 48, is transmitted via the forward line 46 to the emergency-off button 14. In this way, station 32 can determine the activation state of emergency-off button 14 and report to the control unit 20 using a data telegram.

According to the new method, the bus module 26 generates a number of separate data telegrams 52 which are passed on from one station to the next in the manner of a bucket brigade. In FIG. 1, a first data telegram 52a has been sent from the bus module 26 to the station 28 via the first line part 48. Station 28 has passed on the same data telegram 52a to station 30. Station 30 sends the same data telegram 52a without modification to the following station 32. At the same time, i.e. in the same time interval, station 28 sends a second data telegram 52b to station 30. Likewise at the same time, bus module 26 sends a third data telegram 52c to station 28. Overall, bus module 26 generates four separate data telegrams in this exemplary embodiment (the fourth data telegram is not illustrated in FIG. 1), and it sends them to the series 41 of stations at four successive time intervals. Each data telegram 52 comprises an address field 54 which includes an address (not illustrated separately here) which is correlated with the station address 56. In the exemplary embodiment according to FIG. 1, station 28 has the address 001, station 30 has the address 010, station 32 has the address 011, and station 34 has the address 100. In preferred exemplary embodiments, the assignment of addresses to the stations 28 to 34 is carried out using addresses allocation telegrams 58 which are represented using only dashed lines in FIG. 1 because the address allocation takes place before the sending of data telegrams 52, shown in FIG. 1, takes place.

In a particularly preferred exemplary embodiment, each data telegram 52 also comprises a code word 60 which varies from time interval to time interval. In one exemplary embodiment, the code word 60 is changed in each case after a complete communication cycle is terminated, which is explained in more detail below with reference to FIG. 2. In another exemplary embodiment, the code word is changed by the control unit at longer or even shorter time intervals.

Figures 2, 3:
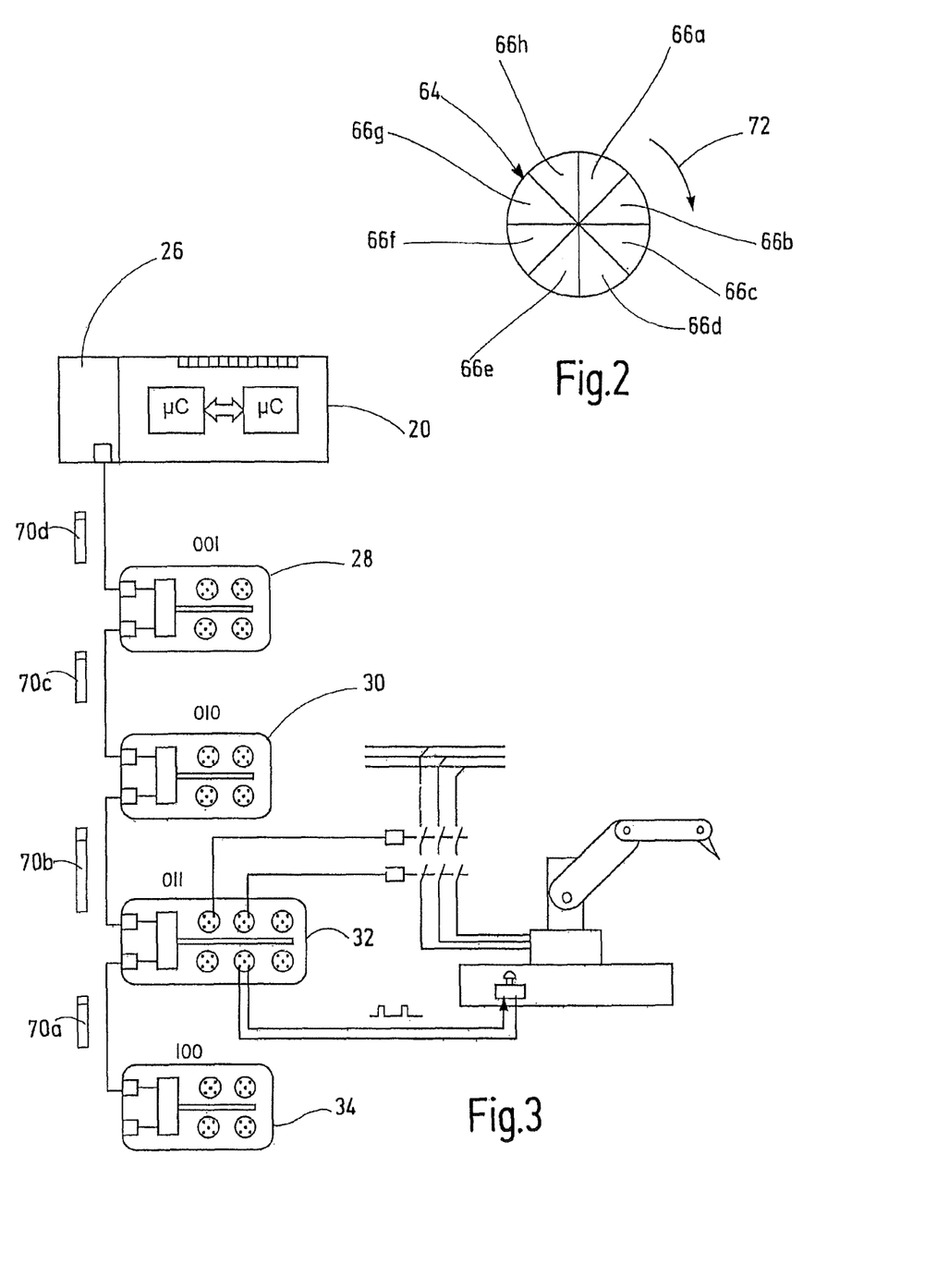
FIG. 2 shows a schematic illustration explaining the cyclical data traffic in the control system according to FIG. 1.
FIG. 3 shows the control system from FIG. 1 at a later instance of time during the data communication according to the new method.

FIG. 2 shows a circle 64 which symbolizes a complete communication cycle. The communication cycle 64 starts with a first time interval 66a in which the bus module 26 sends the first data telegram 52a to its successor, i.e. to station 28. The other stations 30 to 34 do not send any data telegrams 52 in this time interval 66a unless direct cross communication is to take place between individual stations in such "unused" time intervals, which is perfectly possible in exemplary embodiments of the invention. However, in a preferred exemplary embodiment no such cross communication between the individual stations takes place.

In the second time interval 66b, station 28 passes on the received data telegram 52a to the station 30. Furthermore, said station 28 receives a second data telegram 52b from bus module 26 within the same time interval 66b. In the third time interval 66c, three data telegrams 52a, 52b, 52c are en route on the various line parts between the stations 26, 28, 30 and 32. In the fourth time interval 66d, bus module 26 sends a fourth data telegram to station 28, while the last station 34 receives the first data telegram 52a. After a number of time intervals 66a-66d, corresponding to the number of second stations plus the last station, every station has therefore received a data telegram 52 which is addressed to it. In the preferred exemplary embodiment according to FIG. 1, the individual stations 28 to 34 each detect, on the basis of the address fields 54 in the data telegrams 52, whether a data telegram is addressed to said stations. Alternatively to this, it is possible in other exemplary embodiments that the stations detect their respective position within the series of stations and also count the number of passed-on data telegrams 52 in order, in this way, to detect whether a data telegram is addressed to said stations. In such an exemplary embodiment, it is conceivable to dispense with an explicit address field 54 in the data telegrams 52 because the address arises implicitly from the number of data telegrams.

After each station has received a data telegram addressed to it, stations 28 to 34 process the received data telegrams largely simultaneously. The time required for the data processing is not illustrated in FIG. 2 for reasons of clarity. Subsequently, each station 28 to 34 sends to its predecessor a reply telegram 70 which is addressed to the first station 26. This situation is illustrated in FIG. 3. In the first reply interval 66e, the last station 34 sends its reply telegram 70a to its predecessor 32. In the same interval, station 28 sends its reply telegram 70d to the bus module 26 and therefore to the control unit 20. In the next time interval 66f, bus module 26 receives the reply telegram 70c from station 30. In the next time interval 66g, bus module 26 receives the reply telegram 70b from station 32. In the last time interval 66h of the communication cycle 64, bus module 26 receives the reply telegram 70a of the last station 34. A new communication cycle 64 can then start, and is represented by arrow 72 in FIG. 2.

The address of the first station 26 can be implicitly contained in the reply telegrams 70, since the address is already apparent from the transmission and/or reception direction of the reply telegrams 70. However, the first station can also have an explicit address, such as for example the address 000. It is therefore in principle not necessary for the reply telegrams 70 to include an explicit address information item in order to address the first station 26.

The first line part 40a (first bus segment) is utilized to an optimum degree without considerable waiting times in this method since data telegrams and reply telegrams are transmitted via this line part 40a during the entire communication cycle 64. In other words, a data telegram or reply telegram is transmitted via the first line element 40a in each time interval 66. The second line element 40b is utilized somewhat less because no data telegram or reply telegram is transmitted via this line element 40b in the first time interval 66a or in the last time interval 66h. Telegrams are transmitted in all the other time intervals 66. The further a line part or bus segment is from the first station 26, the lower the bus utilization on the segment, which is, however, not a disadvantage since the first line part 40a can be utilized to an optimum degree and adapted to the processing speed of the bus module 26 or the control unit 20.

The first station 26 therefore sends a data telegram 52a to the last station 34 in the first time interval 66a. Station 26 subsequently sends further data telegrams, which are addressed to the second stations in reverse order with respect to the distance from the first station. In this case, all the stations 28 to 34 send the reply telegrams 70 largely simultaneously to the first station 26, wherein the reply telegrams 70 arrive in different time intervals 66e to 66h at the first station 26 as a result of the different distances. In contrast to a common data frame, as it is used in Interbus or in similar methods, data communication takes place on the basis of separate data telegrams and reply telegrams which are independent of one another and can be addressed individually. It is basically possible that the first station 26 does not address every further station 28 to 34 in each communication cycle 64, with the result that the stations 28 to 34 can be interrogated in different cycles. This makes it possible to adapt the bus utilization to the properties of the control system 10 on a more individual basis.

In the preferred exemplary embodiments, each station 28 to 34 is assigned a unique address 56. This is preferably done using the address allocation telegrams 58 in an initialization mode which can either be started manually, or, when voltage is restored, can be started automatically, which is very advantageous. In the initialization mode, the first station 26 sends a first address allocation telegram 58 to its successor 28. If the successor 28 has not had an address assigned to it, it adopts the address (here address 001) included in the address allocation telegram 58, and confirms the address assignment by means of a confirmation telegram to the first station 26. The first station 26 then sends a further address allocation telegram with a further (other) address to its successor 28. Since the successor 28 has already had an address assigned to it, it passes on the address allocation telegram 58 to the subsequent station 30. The latter adopts the address and confirms the address assignment. In this way, all the stations in the series receive a unique address, which address corresponds, in the simplest case, to the position of the respective station within the series. On the basis of the confirmation telegrams, the first station 26 is informed how many subsequent stations are connected. In the case of safety-related stations, an assigned address can advantageously be verified using further telegram traffic.

As has already been indicated above, the new method and the new device are flexible to the extent that the data telegrams 52a, 52b which are addressed to various stations 34, 32, can differ from one another structurally, which is represented symbolically in FIG. 1 by means of the two data telegrams 52a 52b.

In preferred exemplary embodiments, the stations 28 to 34 encode their transmission data to the first station 26 with a code word 60 which is sent with each data telegram 52 by the first station 26. In preferred exemplary embodiments, the first station changes the code word with each new communication cycle 64. In preferred exemplary embodiments, the stations 28 to 34 additionally send the uncoded information, that is to say as it were in "plain text". In this way, the first station 26 receives the data from the other stations in duplicate and can perform plausibility checks on the basis of the different transmission (plain text and variable encoding). In particular, by using the variable code words it is possible to discover stuck-at faults, even if the data of the individual stations are constant over a large number of time intervals. In these exemplary embodiments, the control system 10 is particularly well suited for controlling safety-related processes. Further details for encoding the data on the basis of code words 60 which vary over time are described in DE 103 20 522 A1, which is incorporated by reference herewith in its entirety.

What is claimed is:

1. A method for transmitting data in an automated control system having a plurality of spatially distributed stations which are connected from station to station to form a series of stations, wherein the series has a first station, at least one second station and a last station, wherein the first station and every second station each have a successor in the series, and wherein every second station and the last station each have a predecessor in the series, the method comprising the following steps:

the first station generates a number of separate data telegrams, which number is equal to the number of second stations plus the last station, wherein each data telegram is addressed to one of the second and the last stations, the first station sends the data telegrams one by one at defined time intervals to its successor, wherein the data telegrams are addressed in reverse order of the series of stations, such that, in sequence, a first data telegram sent by said first station to its successor at a first defined time interval defining the beginning of a communication cycle is addressed to the last station, a second data telegram sent by said first station to its successor at a second defined time interval is addressed to the predecessor of the last station, etc., and a last data telegram sent by said first station to its successor at a last defined time interval in said communication cycle is addressed to its successor, every second station receives a data telegram from its respective predecessor and sends the received data telegram to its respective successor in a manner of a bucket brigade at said defined time intervals, until it receives a data telegram which is addressed to itself, and the second stations and the last station each generate an individual reply telegram related to an operating condition of the station which is directed to the first station in response to the receipt of a data telegram addressed to itself, and they send the individual reply telegrams to their respective predecessor in a manner of a bucket brigade, wherein the stations send the data telegrams substantially simultaneously to their respective successors such that every station receives a data telegram addressed to itself after a number of time intervals which is equal to the number of second stations plus the last station, wherein the second stations and the last station process the received data telegrams substantially simultaneously and generate their respective individual reply telegrams at substantially the same instance in time, wherein the first station receives the individual reply telegrams from all of the second stations and the last station one after another within a single communication cycle that ends when the first station receives the reply telegram from the last station, such that the first station transmits a separate data telegram to, and receives a reply telegram from, each of the second stations and the last station in one communication cycle, and wherein the first station generates and sends an individual data telegram for every second station and for the last station, wherein the individual data telegrams for at least two different stations are structurally different in structure, length and/or position of an address data.

2. The method of claim 1, wherein the first station generates a plurality of address allocation telegrams and sends them to its successor before data telegrams are sent for the first time, and wherein the second stations and the last station each are assigned a unique station address on the basis of the address allocation telegrams.

3. The method of claim 2, wherein any second station which has been assigned with a unique station address sends the address allocation telegrams to its respective successor.

4. The method of claim 1, wherein the second stations each have a first and a separate second bus connector, wherein every second station is connected via the first bus connector to its predecessor and via the second bus connector to its successor.

5. The method of claim 4, wherein the bus connectors are CAN-bus-compatible.

6. The method of claim 1, wherein the first station sends the data telegrams at cyclically recurring time intervals, wherein each data telegram comprises a variable code word which varies from time interval to time interval, and wherein the second stations and the last station generate the respective individual reply telegrams as a function of the variable code word.

7. A control system having a plurality of spatially distributed stations, at least some of which have input connectors for connecting sensors or output connectors for connecting actuators, wherein the stations are connected from station to station to form a series of stations, wherein the series of stations has a first station, at least one second station and a last station, wherein the first station and every second station each have a successor in the series, and wherein every second station and the last station each have a predecessor in the series, and wherein the first station is designed to generate a number of separate data telegrams, which number is equal to the number of second stations plus the last station, with every data telegram being addressed to one of the second and the last stations, wherein the individual data telegrams for at least two different stations are structurally different in structure, length and/or position of an address data, the first station is further designed to send the data telegrams one by one at defined time intervals to its successor, wherein the data telegrams are addressed in reverse order of the series of stations, such that, in sequence, a first data telegram sent by said first station to its successor at a first defined time interval defining the beginning of a communication cycle is addressed to the last station, a second data telegram sent by said first station to its successor at a second defined time interval is addressed to the predecessor of the last station, etc., and a last data telegram sent by said first station to its successor at a last defined time interval in said communication cycle is addressed to its successor, every second station is designed to receive a data telegram from its respective predecessor and to send the received data telegram to its respective successor in the manner of a bucket brigade at said defined time intervals, until it receives a data telegram which is addressed to itself, and the second stations and the last station each are designed to generate an individual reply telegram related to an operating condition of the station which is directed to the first station in response to the receipt of a data telegram addressed to itself, and to send the individual reply telegrams to their respective predecessors in the manner of a bucket brigade, wherein the stations send the data telegrams substantially simultaneously to their respective successors such that every station receives a data telegram addressed to itself after a number of time intervals which is equal to the number of second stations plus the last station, wherein the second stations and the last station process the received data telegrams substantially simultaneously and generate their respective individual reply telegrams at substantially the same instance in time, and wherein the first station receives the individual reply telegrams from all of the second stations and the last station one after another within a single communication cycle that ends when the first station receives the reply telegram from the last station such that the first station transmits a separate data telegram to, and receives a reply telegram from, each of the second stations and the last station in one communication cycle.

* * * * *